United States Patent [19]

Caporiccio et al.

[11] Patent Number: 4,657,687
[45] Date of Patent: Apr. 14, 1987

[54] LUBRICATING COMPOSITIONS HAVING IMPROVED FILM-FORMING PROPERTIES

[75] Inventors: Gerardo Caporiccio; Mario A. Scarati, both of Milan, Italy

[73] Assignee: Montedison S.p.A., Milan, Italy

[21] Appl. No.: 828,683

[22] Filed: Feb. 12, 1986

[30] Foreign Application Priority Data

Feb. 14, 1985 [IT] Italy .................. 19525 A/85

[51] Int. Cl.$^4$ .................................. C10M 147/04
[52] U.S. Cl. ............................... 252/54; 252/58
[58] Field of Search .......................... 252/54, 58

[56] References Cited

U.S. PATENT DOCUMENTS

| | | |
|---|---|---|
| 3,367,868 | 2/1968 | Skehan et al. ............... 252/54 |
| 3,445,392 | 5/1969 | Gamprecht et al. .......... 252/54 |
| 3,788,987 | 1/1974 | Bartlett ........................ 252/54 |
| 4,438,006 | 3/1984 | Snyder, Jr. et al. .......... 252/54 |

Primary Examiner—Jacqueline V. Howard
Attorney, Agent, or Firm—Stevens, Davis, Miller & Mosher

[57] ABSTRACT

Lubricating compositions having improved film-forming properties comprising:
(A) a perfluoropolyether having a viscosity ranging from 150 to 2,000 cSt (at 20° C.);
(B) a perfluoropolyether having a viscosity $\leq 50$ cSt (at 20° C.);

and in which compound (B) is utilized in amounts ranging from 2 to 20% by weight with respect to the sum of (A) and (B).

7 Claims, No Drawings

LUBRICATING COMPOSITIONS HAVING IMPROVED FILM-FORMING PROPERTIES

DESCRIPTION

This invention relates to lubricating compositions based on perfluoropolyethers o fluoropolyethers having improved film-forming properties.

BACKGROUND OF THE INVENTION

As is known, perfluoropolyethers having a viscosity from 150 to 2,000 cSt (at 20° C.) are utilized as lubricants since they are endowed with good characteristic properties, for example, chemical and thermal resistance, wetting power and lubricating power.

Said properties render the perfluoropolyethers suited to be employed also in extremely thin films, of the order of tens of hundreds of Å, as surface protecting agents.

For particular uses, as lubricants for recording media, either magnetic tapes or magnetic discs, the perfluoropolyethers are usually applicated starting from 1,1,2-trichlorotrifluoroethane solutions. This application method does not permit to obtain high-quality homogeneous and continuous films, which is an essential characteristic in order to obtain magnetic surfaces protected from surface wear, which, therefore, maintain unaltered their store capacity for a long time, nor it permits to protect the reading heads. These media, in fact, due to their operating system, are subject to the risk of abrasions due to rubbing of the head on the magnetic surface.

The non-homogeneity and non-continuity of the films are influenced by various factors, such as e.g. the rapid evaporation of the solvent utilized during the film deposition step.

The methods usually employed to obtain thin films of perfluoropolyethers consist, in fact, in spraying onto the surface to be protected, a solution of perfluoropolyether dissolved in suitable solvents, or in putting the magnetic media into said solution, or in distributing said solution onto the disc by centrifugation. 1,1,2-trichlorotrifluoroethane is generally used as a solvent, and solutions with a concentration below 10% by weight of perfluoropolyether, preferably from 1 to 5% by weight, are utilized.

After the deposition of the solution, it can follow the solvent evaporation step and the homogenization step of the residual lubricating layer by rubbing of the surface.

Furthermore, the mechanical stresses which the magnetic tapes are subjected to during their winding up, or the centrifugal force which the discs are subjected to during their operation, tend to further reduce the film homogeneity and continuity, since they cause lubricant migration phenomena with consequent thinning and breaking of the film.

THE PRESENT INVENTION

It has now surprisingly been found that the drawbacks mentioned hereinbefore can be overcome if the perfluoropolyether employed as a lubricant is admixed with a particular coadjuvant. Thus, the object of the present invention are lubricating compositions, having improved characteristics, comprising:

(A) a perfluoropolyether having a viscosity ranging from 150 to 2,000 cSt (at 20° C.);

(B) a perfluoropolyether having a viscosity lower than or equal to 50 cSt (at 20° C.);

and in which compound (B) is employed in amounts ranging from 2 to 20% by weight with respect to the sum of (A) and (B). Any perfluoropolyether or fluoropolyether of the classes (A) and (B) can be used provided that their viscosity be in the range indicated above.

The perfluoropolyethers of type (A) are selected in particular from the following classes of compounds comprising the units of the type indicated hereinbelow:

(A1) $(C_3F_6O)$ and $(CFXO)$ statistically distributed along the perfluoropolyether chain, where X is equal to $-F$, $-CF_3$;

(A2) $(C_3F_6O)$;

(A3) $(C_3F_6O)$, $(C_2F_4O)$, $(CFXO)$, statistically distributed along the perfluoropolyether chain, where X is equal to $-F$, $-CF_3$;

(A4) $(C_2F_4O)$ and $(CF_2O)$, statistically distributed along the perfluoropolyether chain; or only $(C_2F_4O)$;

The perfluoropolyethers of type (B) are selected in particular from the classes of compounds containing the following repeating units:

(B1) $(C_3F_6O)$, $(CFXO)$, statistically distributed along the perfluoropolyether chain, where X is equal to $-F$, $-CF_3$;

(B2) $(C_3F_6O)$;

(B3) $(C_3F_6O)$, this class comprises furthermore the typical group $-CF(CF_3)-CF(CF_3)-$;

(B4) $(C_2F_4O)$, $(CF_2O)$, statistically distributed along the chain; or a compound:

(B5) an oxetane ring of general formula selected from:

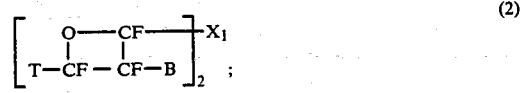

in which at least one of the groups linked to the ring contains an ether oxygen atom; or an oxetane ring of general formula selected from:

in which the group linked to the ring contains at least an ether oxygen atom.

Preferably compound (B), used as a film-forming coadjuvant, is employed in amounts ranging from 5 to 10% by weight.

The perfluoropolyethers of type (A) which are useful in the present invention are selected in particular from the ones belonging to the following perfluoropolyether classes:

(A1) $CF_3O(C_3F_6O)_m(CFXO)_n$—$CF_2X$ where X may be —F or —$CF_3$; m and n are integers and selected in any case in such a way that the viscosity of the compound is generally in the range indicated hereinabove for class (A); the m/n ratio varies from 5 to 40. These compounds are prepared by the process described in GB Pat. No. 1,104,482 and by the subsequent neutralization reaction as indicated hereinafter in class (B1);

(A2) $C_3F_7O(C_3F_6O)_m$—$R_f$ wherein $R_f$ may be —$C_2F_2$, —$C_3F_7$, —$CFHCF_3$, and m is an integer such that the viscosity of the compound is in the range indicated hereinbefore for class (A). These compounds are prepared according to U.S. Pat. No. 3,242,218, as specified hereinafter in class (B2); or $D(CF_2CF_2CF_2O)_nD_1$ in which D=F, $OCF_3$, $OC_2F_5$; $D_1=CF_3$, $C_2F_5$, $C_3F_7$, said compound being obtained according to published European Patent Applic. No. 148,482.

(A3) $CF_3O(C_3F_6O)_m(C_2F_4O)_n(CFXO)_q$—$CF_3$ wherein X is equal to —F, —$CF_3$; m, n and q are integers and the ratio m/(n+q) ranges from 0 to 50, n/q ranges from 0 to 10, and in any case the value of m, n and q are selected in order to obtain a product having the viscosity indicated hereinabove for class (A). These products are prepared by photo-oxidation of mixtures of $C_3F_6$ and $C_2F_4$ and subsequent neutralization with fluorine according to the process described in U.S. Pat. No. 3,665,041;

(A4) $CF_3O(C_2F_4O)_p(CF_2O)_q$—$CF_3$ where p and q are integers either like or unlike each other in which the p/q ratio ranges from 0.5 to 1.5, and the values of p and q are such to give the viscosity specified hereinbefore for class (A). These perfluoropolyethers are prepared according to the teaching of U.S. Pat. No. 3,715,378, and are subsequently neutralized with fluorine according to patent No. 3,665,041; the compounds in which q=o are obtained according to U.S. Pat. No. 4,523,039.

(A5)
(I) RO—$(C_3F_6O)_m(CFXO)_n$—CFX—L, or
(II) R"CFXO—$(C_3F_6O)_x(CFXO)_y$—$(C_2F_4O)_z$—CFX—L, where
R=—$CF_3$, —$C_2F_5$, —$C_3F_7$
X=—F, —$CF_3$
R"=—F, —$CF_3$, —$C_2F_5$
m=an integer other than zero,
n=a finite integer, or zero, and where n is a finite integer m/n ranges from 5 to 20 and R preferably is $CF_3$; where n is equal to zero R preferably is —$C_2F_5$ or —$C_3F_7$;
x=integer number or zero;
y, z=finite integers, and (x+z)/y ranges from 5 to 0.5, provided that, when x=zero, z/y ranges from 1 to 0.5, while X is preferably —F, and R"=L
L=group Y-Z, where
Y=—$CH_2O$—, —$CH_2OCH_2$—, —$CF_2$—, —$CF_2O$—
Z=an organic, non-aromatic, non-fluorinated radical, free from activated hydrogen atoms, containing two or more like or unlike heteroatoms, electron doublets donors, or an aromatic radical, either or not containing heteroatoms, capable of giving rise to coordinative bonds or to charge-transferring bonds, thus causing various kinds of adsorption phenomena on metal surfaces, polymeric surfaces or on surfaces of ceramic materials;

as is described in Italian patent applications Nos. 21480 A/84 and 21481 A/84. Other suitable compounds are described in U.S. Pat. No. 3,810,874.

The perfluoropolyethers of class (A5) are prepared according to the methods described in the above-said Italian patent applications Nos. 21480 A/84 and 21481 A/84 and the various indexes specified hereinabove are selected in order to obtain the viscosity which is indicated in general for class (A). Suitable compounds of class (A2) are also those comprising ($CH_2CF_2CF_2O$) units obtained according to the above mentioned European Pat. No. 148.482.

The film-forming coadjuvants are perfluoropolyethers preferably selected from the following classes:

(B1) $CF_3O(C_3F_6O)_m(CFXO)_n$—A, where X is equal to —F, —$CF_3$; A may be —$CF_3$, —$CF_2H$, —CFH—$CF_3$; the units ($C_3F_6O$) and (CFXO) are statistically distributed along the perfluoropolyether chain, m and n are integers and such that the viscosity is within the value indicated in general for class (B); the m/n ratio ranges from 5 to 40. These perfluoropolyethers are prepared by photo-oxidation of hexafluoropropene according to the process described in GB Pat. No. 1,104,482 and by subsequent neutralization with fluorine or by alkaline hydrolysis and decarboxylation at 150°-200° C. starting from precursor acylfluoride, according to patent GB No. 1,226,566;

(B2) $C_3F_7O(C_3F_6O)_m$—$R_f$, where $R_f$ may be —$C_2F_5$, —$C_3F_7$, —$CFHCF_3$ and m is a positive integer and such that the viscosity of the product is within the range indicated for class (B). They are prepared by ionic telomerization of the hexafluoropropene epoxide and subsequent neutralization of the acid fluoride with fluorine, and by alkaline hydrolysis and decarboxylation at 150°-200° C., of the telomer having an acylfluoride end group according to the processes described in U.S. Pat. No. 3,242,218;

(B3) $[C_3F_7O(C_3F_6O)_m$—$CF(CF_3)$—$]_2$, where m is an integer such that the viscosity of the product is within the indicated range of class (B). These products are prepared by ionic telomerization of the hexafluoropropene epoxide and subsequent photochemical dimerization of the acid fluoride according to processes described in U.S. Pat. No. 3,214,478;

(B4) $CF_3O(C_2F_4O)_p(CF_2O)_q$—$CF_3$, where p and q are integers like or different from each other and are such that the viscosity is within the range indicated for class (B); in which the p/q ratio ranges from 0.5 to 1.5. Said products are obtained by photo-oxidation of tetrafluoroethylene according to U.S. Pat. No. 3,715,378, and by subsequent neutralization with fluorine according to the process described in U.S. Pat. No. 3,665,041.

(B5) compound of general formula:

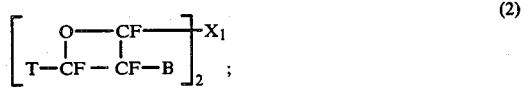

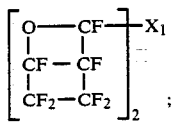
(3)

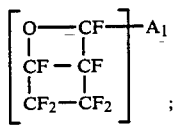
(4)

where $A_1 = F$, or a perfluoroalkyl radical $R_{f1}$ with 1 to 8 carbon atoms, or a group $-OR_{f1}$, or a group

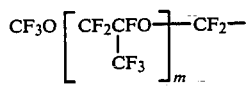

in which m is an integer from 0 to 5 (extremes included), or a group

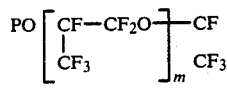

in which P is a perfluoroalkyl radical with 1 to 8 carbon atoms and m is the same as defined hereinbefore; B and T, either like or different from each other, may be: F, or a perfluoroalkyl radical $R_{f1}$ with 1 to 7 carbon atoms, or a group

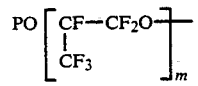

in which m and P are the same as defined hereinabove, $X_1$ is equal to a group $-CF_2O-(CF_2O)_p-(C_2F_4O)_q-CF_2-$; in which p and q, like or different from each other, are integers from 0 to 5 (extremes included), and where the sum p+q is equal at least to 1, or a group $-(CF_2)_r-$, in which r is an integer from 1 to 8; and are characterized in that at least one of groups $A_1$, B and T in class (1), or B, T, $X_1$ in class (2) contains one or more ether oxygen atoms, and in classes (3) and (4) groups $X_1$ and $A_1$ are selected from the above mentioned radicals containing ether oxygen atoms; and characterized furthermore in that, when one of radicals B or T is equal to group

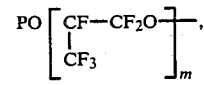

the other is equal to F. Said perfluoroethers are prepared by reactions based on the cycloaddition between a fluoride of a perfluorinated acid and a perfluoroolefin, in which at least one of the compounds contains an ethereal oxygen atom, according to what is described in patent application No. 19496 A/85;

According to the present invention the best results are obtained when using perfluoropolyethers of type (A) having viscosities ranging from 250 to 1,500 cSt (at 20° C.), and perfluoroethers of type (B) with a viscosity of from 7 to 40 cSt (at 20° C.). The results of the invention are so much the more surprising as the coadjuvant of type (B) does generally not possess sufficient lubricating characteristics and the viscosity of the mixtures is lower than the one of starting lubricant (A), but it is always within the viscosity range of the perfluoropolyethers of type (A) which, utilized as such without coadjuvants, provide non-homogeneous and discontinuous films, as mentioned hereinbefore. It has been observed that the compositions of the invention provide films having a very long life under the standard utilization conditions for the appliances mentioned in the invention—sometimes reaching about ten years.

The compositions of the present invention are utilized, as described hereinbefore, for producing films on magnetic media. A preferred method consists in preparing a solution of said compositions at 1–5% by weight, in particular from 1 to 2% by weight, in 1,1,2-trichlorotrifluoroethane. Application of the film takes place by spraying the solution onto the surface to be coated, or by immerging the latter into the solution, whereafter the solvent is evaporated at temperatures ranging from 20° to 30° C. Optionally the surface is then subjected to rubbing or polishing by means of gauzes of polyester and/or cellulose fabric or by means of rolling with rolls coated with such fabric.

The resulting films are characterized by measuring the following magnitudes:

measure of the spreading rate of a lubricant drop on a horizontal smooth surface (horizontal spreading), or migration of a lubricant film on a vertical smooth surface (vertical spreading);

spreading area: from the measure of the horizontal spreading it is calculated the area of the circle that forms at the interface between lubricant and substrate;

uniformity of the deposited lubricant film thickness, by measurement of the standard deviation of the same and examined thicknesses.

The measurement methods are illustrated in examples 1 and 2, respectively.

The film-forming coadjuvants of the present invention when utilized in the lubricating composition for magnetic media, such as tapes and discs permit to obtain thin, homogeneous and uniform films.

The films obtainable on a continuous surface generally exhibit a thickness of the order of 20–1,000 Å, in particular of 50–500 Å.

The composition of the present invention can be used also in the impregnation of magnetic nuclei of electromagnetic contactors.

In such case, the use of the lubricant as an impregnating agent for the reed pack both for reducing or at any rate for damping the vibrations of the metal armature and of the contacts, and for limiting or minimizing the corrosions due to moisture penetration into the reed pack.

The magnitudes measured for this appliance are the wet area and the weight of absorbed lubricant, and they are determined as is described in example 3.

Another application of the compositions of the invention consists in the impregnation of porous metal bushes.

In this application it is essential to obtain a quick impregnation under vacuum, as well as a good wettability characteristic by the lubricating fluid, in order to promote a spontaneous circulation of the oil under load.

The measured magnitudes are the impregnation factor and the life of the bushes, and they are determined as is described in example 4.

The following examples are given to the only purpose of illustrating the invention, without being however a limitation thereof.

EXAMPLE 1

Mixtures consisting for 90% by weight of a compound of class (A) and for 10% by weight of a compound of class (B) were prepared.

The effect of film-forming coadjuvant (B) on the spreading velocity of the perfluoroether lubricants of class (A) was determined by means of horizontal spreading measurements of the mixtures prepared hereinabove. Measurements were carried out as follows: droplets having a volume of 2–5. $\mu l$ of the mixtures prepared as indicated above were laid onto thin metal cobalt plates, lapped according to metallographic techniques.

The increase in the droplet diameter was observed, after a prefixed time of 40 minutes, under an optical, low-enlargement microscope equipped with a measure reticule.

The obtained values are reported in Table 1.

COMPARATIVE EXAMPLE 1

The same spreading measurements of example 1 were carried out on a few classes of lubricants (A) as such.

The obtained data, reported in Table 1, are indicative of an increase both in the spreading diameter and in the spreading area in the tests carried out in the presence of the coadjuvant, as compared with the tests carried out in the absence thereof, what proves that the addition of film-forming coadjuvants improves the wetting properties of the lubricant and increases its spreading velocity in the substrate.

EXAMPLE 2

Mixtures were prepared, which consisted of a compound of class (A) and of a compound of class (B), as is described in Example 1.

The effect of the coadjuvant (B) on the thickness uniformity of the film of perfluoroether lubricants (A) was determined through measurements of the thickness of the film obtained on metallic discs with a Co-Ni magnetic layer, lubricated by immersion into solutions at 1% by weight of the mixture of lubricant (A) and coadjuvant (B), specified hereinbefore, in 1,1,2-trichlorotrifluoroethane solvent.

The discs, after immersion into the solution, were taken out at a speed of 0.5 cm/second, then, after a 1-hour exposure under a hood in a dust-free environment, the film thickness was measured by means of infrared spectrometry with Fourier transformation in reflection on 60 equidistant selected points on 6 radial directions of the disc.

The standard deviation was calculated on the basis of the thickness values so measured.

The obtained results are reported in Table 2.

COMPARATIVE EXAMPLE 2

The same thickness measurements were carried out on some classes of lubricants (A) as such, reported in Table 2.

The data obtained show the different behaviour of the lubricants as such as compared with the mixtures in which the coadjuvant is used. A higher value of the standard deviation in the case of the thickness measurements carried out on coadjuvantfree mixtures shows that the addition of coadjuvants promotes a better and more uniform distribution of the film on the metal substrate of the magnetic media.

TABLE 1

| Lubricating oil type (A) | Coadjuvant type (B) | Viscosity of the mixture cSt (at 20° C.) | Spreading diameter after 40' (mm) | Spreading area after 40' (cm$^2$) |
| --- | --- | --- | --- | --- |
| $CF_3O(C_3F_6O)_m(CF_2O)_nCF_3$ $\eta = 1500$ cSt (at 20° C.) m/n = 30 | $CF_3O(C_3F_6O)_m(CF_2O)_nCF_3$ $\eta = 40$ cSt (at 20° C.) m/n = 10 | 950 | 11.4 | 1.02 |
| $CF_3O(C_3F_6O)_m(CF_2O)_nCF_3$ $\eta = 1500$ cSt (at 20° C.) m/n = 30 | $CF_3O(C_3F_6O)_m(CF_2O)_nCF_3$ $\eta = 15$ cSt (at 20° C.) m/n = 10 | 870 | 13.0 | 1.33 |
| $CF_3O(C_3F_6O)_m(CF_2O)_nCF_3$ $\eta = 1500$ cSt (at 20° C.) m/n = 30 | $CF_3O(C_3F_6O)_m(CF_2O)_nCF_3$ $\eta = 7$ cSt (at 20° C.) m/n = 10 | 800 | 13.7 | 1.47 |
| $CF_3O(C_3F_6O)_m(CF_2O)_nCF_3$ $\eta = 1500$ cSt (at 20° C.) m/n = 30 | — | 1.500 | 9.00 | 0.64 |
| $CF_3O(C_2F_4O)_p(CF_2O)_qCF_3$ $\eta = 250$ cSt (at 20° C.) p/q = 0.7 | $C_3F_7O(C_3F_6O)_mC_2F_5$ $\eta = 15$ cSt (at 20° C.) | 180 | 12.7 | 1.27 |
| $CF_3O(C_2F_4O)_p(CF_2O)_qCF_3$ $\eta = 250$ cSt (at 20° C.) p/q = 0.7 | — | 250 | 10.0 | 0.79 |

TABLE 2

| Lubricating oil type (A) | Coadjuvant type (B) | Viscosity of the mixture cSt (at 20° C.) | Standard deviation of examined thicknesses (±%) |
| --- | --- | --- | --- |
| $CF_3O(C_3F_6)_m(CF_2O)_nCF_3$ $\eta = 1.500$ cSt (at 20° C.) m/n = 30 | $CF_3O(C_3F_6O)_m(CF_2O)_nCF_3$ $\eta = 40$ cSt (at 20° C.) m/n = 10 | 950 | 11 |
| $CF_3O(C_3F_6)_m(CF_2O)_nCF_3$ $\eta = 1.500$ cSt (at 20° C.) m/n = 30 | — | 1.500 | 24 |
| $CF_3(C_2F_4O)_p(CF_2O)_qCF_3$ | $CF_3O(C_3F_6O)_m(CF_2O)_nCF_3$ | 195 | 13 |

TABLE 2-continued

| Lubricating oil type (A) | Coadjuvant type (B) | Viscosity of the mixture cSt (at 20° C.) | Standard deviation of examined thicknesses (±%) |
|---|---|---|---|
| $\eta$ = 250 cSt (at 20° C.) p/q = 0.7 $CF_3(C_2F_4O)_p(CF_2O)_qCF_3$ $\eta$ = 250 cSt (at 20° C.) p/q = 0.7 | $\eta$ = 40 cSt (at 20° C.) m/n = 10 | 250 | 21 |
| $CF_3O(C_2F_4O)_p(CF_2O)_qCF_3$ $\eta$ = 600 cSt (at 20° C.) p/q = 0.7 | $C_3F_2O(C_3F_6O)_mC_2F_5$ $\eta$ = 40 cSt (at 20° C.) | 500 | 12 |
| $CF_3O(C_2F_4O)_p(CF_2O)_qCF_3$ $\eta$ = 600 cSt (at 20° C.) p/q = 0.7 | — | 600 | 26 |

EXAMPLE 3

A reed pack of an electromagnetic contactor having dimensions: 110×160 mm, consisting of 50 reed of 0.3 mm thickness, carefully cleaned and degreased with proper solvents prior to the test, was subjected to impregnation-by-immersion into perfluoroether lubricants prepared according to the method described in example 1.

The reed pack was immersed into the mixtures of lubricant and coadjuvant during 10 minutes at a temperature of 40° C., whereafter it is taken out and dried on the surface.

The effectiveness of the oil penetration into the interstices was check by opening the reed pack and observing by sight the area actually wet between the individual reeds in respect of the areas, if any, remained dry, as well as by weighing the total oil amount remained in the reed pack. The results are reported in Table 3.

COMPARATIVE EXAMPLE 3

The same measurements of wet area and absorbed lubricant weight were carried out on some classes of lubricants (A) as such, reported in Table 3.

The data show the different behaviour of the lubricant as such in respect of the mixtures containing the coadjuvant. In fact, the percent increase of the wet area and the weight increase of absorbed lubricant, in the presence of coadjuvants, show the positive effect of such coadjuvants in improving the penetration of the lubricant into the reed interstices.

vacuum by placing the bushes into a bath of lubricating oil, thermoregulated at 60° C., prepared as indicated in example 1; the bushes were left there during 1 minute.

Thereafter, the bushes were superficially dried and the absorbed oil weight as well as the impregnation factor were measured, the impregnation factor having been calculated as the ratio between the actually absorbed liquid, measured in volume, and the sum of the volume of the bush micropores. The data reported in Table 4 were obtained as average values of 10 samples of bushes.

The bushes were also subjected to a wear test by causing a steel shaft to rotate in them at 1.500 rpm with a radial load of 280N at 150° C. The lifes, calculated on the basis of the revolution numbers performed before having a visible wear (such as acoustic emission, vibrations, sensible clearance), were taken as an average of the impregnation quality.

The results are recorded in Table 4.

COMPARATIVE EXAMPLE 4

The same impregnation factor and bush life measurements were effected on some classes of lubricants (A) as such, reported in Table 4.

The obtained data show the different behaviour of the lubricants as such as compared with the mixtures in which the coadjuvant is used. In fact, the increase of the impregnation factor and the increase in the lift of the bushes, in the presence of coadjuvants, prove the positive effect of such coadjuvants in improving the penetration of the lubricant into the interstices of the bushes

TABLE 3

| Lubricating oil type (A) | Coadjuvant type (B) | Viscosity of the mixture cSt (at 20° C.) | % wet area | Absorbed oil weight (g) |
|---|---|---|---|---|
| $CF_3O(C_3F_6O)_m(CF_2O)_nCF_3$ $\eta$ = 1.500 cSt (at 20° C.) m/n = 30 | $CF_3O(C_3F_6O)_m(CF_2O)_nCF_3$ $\eta$ = 40 cSt (at 20° C.) m/n = 10 | 950 | 77 | 1.90 |
| $CF_3O(C_3F_6O)_m(CF_2O)_nCF_3$ $\eta$ = 1.500 cSt (at 20° C.) m/n = 30 | — | 1.500 | 63 | 1.50 |
| $CF_3O(C_3F_6O)_m(CF_2O)_nCF_3$ $\eta$ = 250 cSt (at 20° C.) m/n = 30 | $CF_3O(C_3F_6O)_m(CF_2O)_nCF_3$ $\eta$ = 40 cSt (at 20° C.) m/n = 10 | 200 | 80 | 2.00 |
| $CF_3O(C_3F_6O)_m(CF_2O)_nCF_3$ $\eta$ = 250 cSt (at 20° C.) m/n = 30 | $C_3F_7(C_3F_6O)_mC_2F_5$ $\eta$ = 7 cSt (at 20° C.) | 170 | 89 | 2.30 |
| $CF_3O(C_3F_6O)_m(CF_2O)_nCF_3$ $\eta$ = 250 cSt (at 20° C.) m/n = 30 | — | 250 | 70 | 1.73 |

EXAMPLE 4

Porous bushes of sintered iron having an outside diameter of 17 mm, an inside diameter of 10 mm, a length of 17 mm, were subjected to impregnation under made of sinterized iron material.

TABLE 4

| Lubricating oil type (A) | Coadjuvant type (B) | Viscosity of the mixture cSt (at 20° C.) | Impregnation factor | Life of the bush (hours) |
|---|---|---|---|---|
| $CF_3O(C_3F_6O)_m(CF_2O)_nCF_3$ $\eta$ = 1.500 cSt (at 20° C.) m/n = 30 | $CF_3O(C_3F_6O)_m(CF_2O)_nCF_3$ $\eta$ = 40 cSt (at 20° C.) m/n = 10 | 950 | 0.91 | 50 |
| $CF_3O(C_3F_6O)_m(CF_2O)_nCF_3$ $\eta$ = 1.500 cSt (at 20° C.) m/n = 30 | — | 1.500 | 0.65 | 40 |
| $CF_3O(C_3F_6O)_m(CF_2O)_nCF_3$ $\eta$ = 250 cSt (at 20° C.) m/n = 30 | $CF_3O(C_3F_6O)_m(CF_2O)_nCF_3$ $\eta$ = 15 cSt (at 20° C.) m/n = 10 | 180 | 0.87 | 56 |
| $CF_3O(C_3F_6O)_m(CF_2O)_nCF_3$ $\eta$ = 250 cSt (at 20° C.) m/n = 30 | $\eta$ = 7 cSt (at 20° C.) m/n = 10 | 170 | 0.88 | 52 |
| $CF_3O(C_3F_6O)_m(CF_2O)_nCF_3$ $\eta$ = 250 cSt (at 20° C.) m/n = 30 | — | 250 | 0.70 | 40 |

What is claimed is:

1. Lubricating compositions having improved film-forming properties comprising:
   (A) a perfluoropolyether having a viscosity ranging from 150 to 2,000 cSt (at 20° C.);
   (B) a perfluoropolyether having a viscosity lower than or equal to 50 cSt (at 20° C.);
   and in which compound (B) is utilized in amounts ranging from 2 to 20% by weight with respect to the sum of (A) and (B).

2. Lubricating compositions according to claim 1, in which the perfluoropolyether of type (A) is selected from the following classes of perfluoropolyethers comprising the repeating units of the type indicated hereinbelow:
   (A1) $(C_3F_6O)$ and (CFXO), statistically distributed along the perfluoropolyether chain, where X is equal to —F, —$CF_3$;
   (A2) $(C_3F_6O)$;
   (A3) $(C_3F_6O)$, $(C_2F_4O)$, (CFXO), statistically distributed along the perfluoropolyether chain, where X is equal to —F, —$CF_3$;
   (A4) $(C_2F_4O)$ and $(CF_2O)$, statistically distributed along the perfluoropolyether chain; or only $(C_2F_4O)$;

and the perfluoropolyether of type (B) is selected from the classes of compounds comprising the following repeating units;
   (B1) $(C_3F_6O)$, (CFXO), statistically distributed along the perfluoropolyether chain, where X is equal to —F, —$CF_3$;
   (B2) $(C_3F_6O)$;
   (B3) $(C_3F_6O)$, this class comprising furthermore the typical group —CF($CF_3$)—CF($CF_3$)—;
   (B4) $(C_2F_4O)$, $(CF_2O)$, statistically distributed along the chain; or a compound:
   (B5)

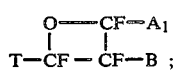   (1)

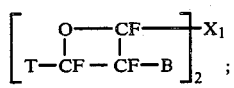   (2)

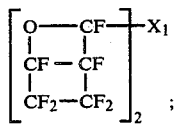   (3)

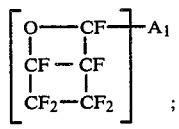   (4)

where $A_1$=F, a perfluoroalkyl radical $R_{f1}$ with 1 to 8 carbon atoms, or a group —$OR_{f1}$, or a group

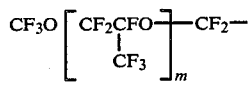

in which m is an integer from 0 to 5 (extremes included), or a group

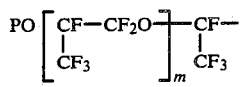

in which P is a perfluoroalkyl radical with 1 to 8 carbon atoms and m is the same as defined hereinabove;
B and T, like or different from each other, may be:
F, or a perfluoroalkyl radical with 1 to 7 carbon atoms, or a group

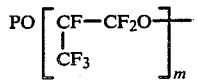

in which m and P are the same as defined hereinbefore, $X_1$ is equal to a group —$CF_2O$—$(CF_2O)$-$_p$—$(C_2F_4O)_q$—$CF_2$—, in which p and q, like or different from each other, are integers from 0 to 5 (extremes included), and the sum P+q is at least equal to 1, or a group —$(CF_2)_r$—, in which r is an integer from 1 to 8; and characterized in that at least one of groups $A_1$, B, T in class (1) or B, T, $X_1$ in class (2), contains one or more ether oxygen atoms, and in classes (3) and (4) the groups $X_1$ and $A_1$ are selected from the above-indicated radicals containing ether oxygen atoms; and furthermore characterized in that, when one of radicals B or T is equal to group

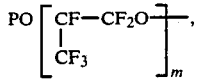

the other is equal to F.

3. Lubricating compositions according to claim 1, in which component (B) is used in amounts ranging from 5 to 10 by weight.

4. Lubricating compositions according to claim 1, in which compound (A) has a viscosity ranging from 250 to 1.500 cSt (at 20° C.).

5. Lubricating compositions according to claim 1, in which compound (B) has a viscosity ranging from 7 to 40 cSt (at 20° C.).

6. Lubricating compositions according to claim 2, in which compound (A) is selected from the following perfluoropolyether classes:

(A1) $CF_3O(C_3F_6O)_m(CFXO)_n$—$CF_2X$ where X may be —F or —$CF_3$; m and n are integers and the m/n ratio varies from 5. to 40 and units ($C_3F_6O$) and (CFXO) are statistically distributed along the perfluoroether chain;

(A2) $C_3F_7O(C_3F_6O)_m$—$R_f$ where $R_f$ may be —$C_2F_5$, —$C_3F_7$, —$CFHCF_3$ and m is an integer; or $D(CF_2CF_2CF_2O)_nD_1$ in which D=F, $OCF_3$, $OC_2F_5$; $D_1$=$CF_3$, $C_2F_5$, $C_3F_7$;

(A3) $CF_3O(C_3F_6O)_m(C_2F_4O)_n(CFXO)_q$—$CF_3$ where X is equal to —F, —$CF_3$; m, n and q are integers and the ratio m/(n+q) ranges from 0 to 50, n/q ranges from 0 to 10 and the units ($C_3F_6O$), ($C_2F_4O$), (CFXO) are statistically distributed along the perfluoroether chain;

(A4) $CF_3O(C_2F_4O)_p(CF_2O)_q$—$CF_3$ where p and q are integers equal or different from each other in which the p/q ratio ranges from 0.5 to 1.5 and the units ($C_2F_4O$) and ($CF_2O$) are statistically distributed along the perfluoroether chain;

(A5)

(I) RO—$(C_3F_6O)_m$—$(CFXO)_n$—CFX—L, or
(II) R″CFXO—$(C_3F_6O)_x(CFXO)_y$—$(C_2F_4O)_z$—CFX—L, where
R=—$CF_3$, —$C_2F_5$, —$C_3F_7$
X=—F, —$CF_3$
R″=—F, —$CF_3$, —$C_2F_5$
m=an integer other than zero
n=a finite integer or=zero, and when n is finite, m/n ranges from 5 to 20 and R is preferably —$CF_3$, if n=zero, R is preferably —$C_2F_5$ or —$C_3F_7$;
x=a finite integer, or=zero;
y, z=finite integers, and (x+z)/y ranges from 5 to 0.5, provided that, when x=zero, z/y ranges from 1 to 0.5, while X is preferably —F, and R″=L;
L=group Y-Z, where
Y=—$CH_2O$, —$CH_2OCH_2$—, —$CF_2$—, —$CF_2O$—
Z=an organic non-aromatic, non-fluorinated radical, free from activated hydrogen atoms, containing two or more like or different heteroatoms donors of electronic doublets, or an aromatic radical either or not containing heteroatoms, capable of giving rise to co-ordinative bonds or to charge-transfer bonds, causabsorption phenomena of various kinds on metal, polymeric surfaces or surfaces of ceramic materials.

7. Lubricating compositions according to claim 2, in which compound (B) is selected from the following classes of perfluoropolyethers:

(B1) $CF_3$—$O(C_3F_6O)_m(CFXO)_n$—A, where X is equal to —F, —$CF_3$; A may be —$CF_3$, —$CF_2H$, —$CFH$—$CF_3$; units ($C_3F_6O$) and (CFXO) are statistically distributed along the perfluoropolyether chain, m and n are integers and the m/n ratio varies from 5 to 40;

(B2) $C_3F_7O(C_3F_6O)_m$—$R_f$, where $R_f$ may be —$C_2F_5$, —$C_3F_7$, —$CFHCF_3$ and m is an integer;

(B3) $[C_3F_7O(C_3F_6O)_m$—$CF(CF_3)]_2$, where m is an integer;

(B4) $CF_3O(C_2F_4O)_p(CF_2O)_q$—$CF_3$, where p and q are integers like or different from each other and in which the p/q ratio ranges from 0.5 to 1.5.

* * * * *